United States Patent
Ackley et al.

(10) Patent No.: US 7,224,401 B2
(45) Date of Patent: May 29, 2007

(54) SYSTEM AND METHOD OF DYNAMIC INTERFACE PLACEMENT BASED ON ASPECT RATIO

(75) Inventors: Jonathan Ackley, Glendale, CA (US); Christopher T. Carey, Santa Clarita, CA (US); Bennet S. Carr, Burbank, CA (US); Kathleen S. Poole, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 370 days.

(21) Appl. No.: 10/859,888

(22) Filed: Jun. 2, 2004

(65) Prior Publication Data

US 2005/0017988 A1  Jan. 27, 2005

Related U.S. Application Data

(60) Provisional application No. 60/475,253, filed on Jun. 2, 2003.

(51) Int. Cl.
*H04N 5/46* (2006.01)

(52) U.S. Cl. ..................... 348/556; 348/558; 348/913

(58) Field of Classification Search ............... 348/556, 348/555, 554, 558, 563, 564, 589, 445
See application file for complete search history.

(56) References Cited

U.S. PATENT DOCUMENTS

| | | | |
|---|---|---|---|
| 6,256,045 B1 * | 7/2001 | Bae et al. | 348/445 |
| 6,486,900 B1 | 11/2002 | Shen et al. | |
| 7,057,640 B2 * | 6/2006 | Bellwood et al. | 348/173 |
| 7,106,383 B2 * | 9/2006 | Kahn | 348/556 |
| 2002/0009295 A1 | 1/2002 | Itani | |
| 2002/0019989 A1 | 2/2002 | Enomoto | |
| 2002/0118299 A1 | 8/2002 | Kahn | |
| 2003/0068161 A1 | 4/2003 | Lasorsa | |
| 2003/0189669 A1 * | 10/2003 | Bowser | 348/564 |

* cited by examiner

*Primary Examiner*—Michael H. Lee
(74) *Attorney, Agent, or Firm*—Farjami & Farjami LLP

(57) ABSTRACT

A system for dynamically placing textual elements adjacent a video content, based on aspect ratios, includes means for detecting the aspect ratio of the media player content and the aspect ratio of the display device and determining if there are unused positions of the video content when displayed on the display device.

20 Claims, 4 Drawing Sheets

SYSTEM AND METHOD OF DYNAMIC INTERFACE PLACEMENT BASED ON ASPECT RATIO

RELATED APPLICATIONS

This application claims priority to U.S. Provisional Patent Application No. 60/475,253, filed Jun. 2, 2003, which is incorporated herein by reference in its entirety. This application is also related to U.S. Utility Patent Application No. 60/475,340 entitled "System And Method Of Programmatic Window Control For Consumer Video Players"; U.S. Utility Patent Application No. 60/475,339 entitled "System And Method Of Interactive Video Playback"; U.S. Utility Patent Application No. 60/475,251 entitled "System And Method Of Video Player Commerce" and U.S. Utility Patent Application No. 10/859,887 entitled "Video Playback Image Processing" all of which are filed concurrently herewith on Jun. 2, 2004, and incorporated by reference herein in their entirety.

BACKGROUND

1. Field

The disclosure generally relates to a system and method for dynamically displaying text and icons over video for producing the best viewing experience.

2. General Background and State of the Art

In current implementations, interface elements linked to video playback are limited in where they appear on the screen. For instance, subtitles on some DVDs are hand-placed by a technician over the video to ensure maximum readability. On some DVDs, movie subtitles are placed in only one area of the screen, regardless of their legibility.

In interactive television applications, the set-top box has no knowledge of the capabilities of the connected output device. Therefore, interactive TV designers choose static or arbitrary screen positions to place the graphics and text displayed by their programs. Even if there were space on the screen unused by the video program, these platforms would be unable to take advantage of the extra real estate.

Additionally, set-top boxes, during real-time HDTV transmissions, may position the video signal in a pillar-box mode, for example on a wide-screen television, where there are two black bars on the side of the video portion. The associated subtitled text, for the hearing impaired or including translations in another language, is also placed on the video portion for maximum readability.

However, existing display controllers, such as set-top boxes, DVD players, VCRs and the like, do not position subtitled text on a screen that would allow maximum visibility of the video portion displayed on a television as well as optimum readability of the associated subtitled text.

SUMMARY

The present disclosure therefore provides a video player or a set-top box capable of evaluating its display environment and automatically re-arranging screen elements, such as video and text, for substantially optimal viewing experience.

The idea is for an interactive media player such as a DVD player, set-top box, PC-DVD Rom or a High-Definition video player, to be intelligent to make optimal use of a television's display surface. The player in accordance with one aspect of an exemplary embodiment detects the aspect ratio of the media it is to play and compares it to that of its output device (e.g., an aspect ratio of the display screen). If the aspect ratios are mismatched between the media and the output device, and result in leaving large portions of the display unused, the media player dynamically moves any screen element to improve subtitled text legibility or improve the usability of on-screen interfaces. In an exemplary aspect, the aspect ratio of the display device may be detected through multimedia interfaces. An example of a multimedia interface is the multi-pin High Definition Multimedia Interface (HDMI) interface. The HDMI interface transfers uncompressed digital video with HDCP copy protection and multichannel audio. Using an adapter, HDMI is backward-compatible with most current DVI connections. HDMI connectors are found on various DVD players, A/V receivers, and TVs. Another example of a multimedia interface is the Digital Visual Interface (DVI) which provides a high-resolution digital video signal to HD-compatible TVs with a compatible connector. The digital video signal is generally encrypted with High-bandwidth Digital Content Protection (HDCP) to prevent recording. Alternatively, a high speed firewire connection could be employed for detecting the aspect ratio. The multimedia interface may then permit querying of the output device in order to determine its aspect ratio.

In one aspect, the display screen may be standard having an aspect ratio of 4:3 which gives the screen 1.33 inches of width for every inch of height, or widescreen with an aspect ratio of 16:9 which gives 1.76 inches of width for every inch of height. Alternatively, widescreen TV's with aspect ratios of 1.85:1 may also be used.

Other features and advantages of the present disclosure will be set forth, in part, in the descriptions which follow and the accompanying drawings, wherein the preferred embodiments of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appended claims.

It should be appreciated that for simplicity and clarity of illustration, elements shown in the Figures have not necessarily been drawn to scale. For example, the dimensions of some of the elements are exaggerated relative to each other

DETAILED DESCRIPTION

Detailed descriptions are disclosed herein. However, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

An exemplary embodiment for dynamically locating objects for display on a screen, depending on the aspect ratio of playback media content and the display device, involves a system and method residing on a media playback device. Examples of such media playback devices include a DVD player, digital video tape machine, a set-top box, or a computer software video player.

Figure 1A:
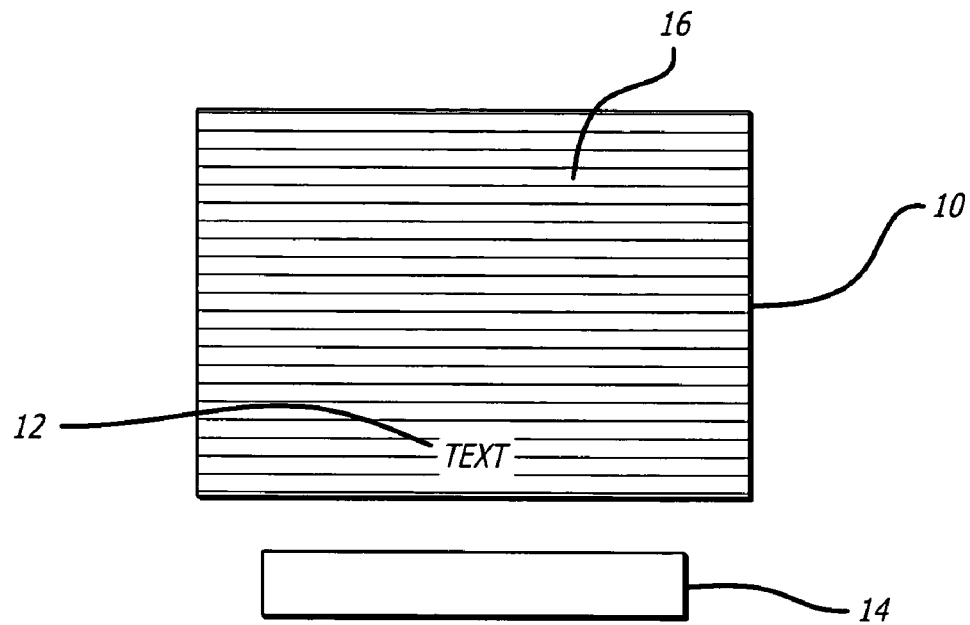
FIGS. 1A and 1B illustrate examples of existing display devices having arbitrary aspect ratios for displaying video content and textual content in shaded area.
Figure 1B:
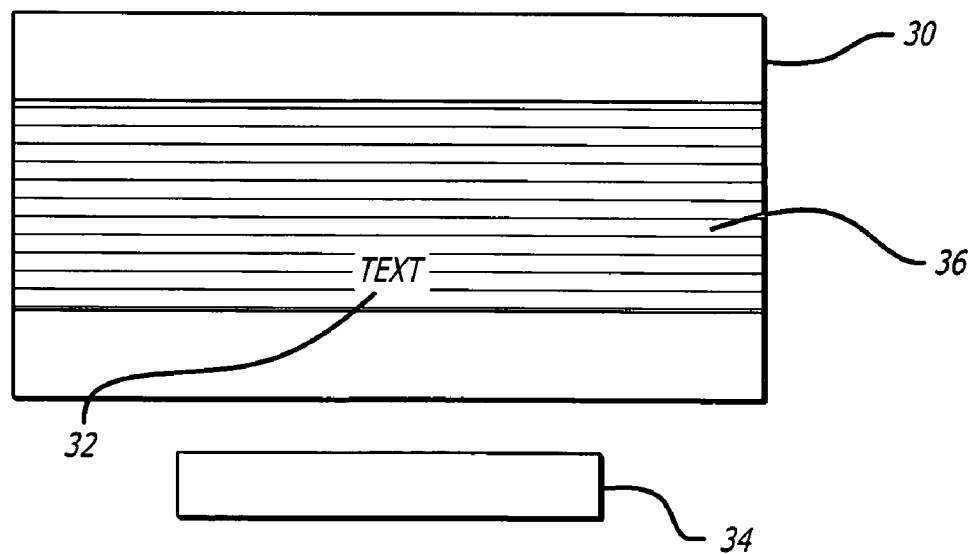

FIGS. 1A and 1B illustrate examples of existing display devices (10, 30), having arbitrary aspect ratios for displaying video content (16, 36) and textual information or elements (12, 32). As can be seen, the textual information (12, 32), which may be subtitled text for the hearing impaired or language translations, overlaps the video content (16, 36) thereby affecting the visibility of the video portion (16, 36), displayed on the screen (10, 30), as well as readability of the textual elements (12, 32). The media (video and text) displayed on the display devices, or screens, may be delivered either through a DVD player, digital video tape machine, a set-top box, a computer software video player, or any another media device, and is generally shown as elements (14, 34) in FIGS. 1A and 1B.

Accordingly, in an exemplary embodiment a media control program, for properly positioning the textual information such that it does not substantially overlap with the video content, may reside in a semiconductor chip or processor (not shown) located either in the media playback device (14, 34) or in the display device (10, 30). The program in accordance with an exemplary aspect includes logic for detecting the aspect ratio of the media, such as DVD content or a High Definition TV signal, located on the media playback device (14, 34). Additionally, the media control program may also have the ability to query the aspect ratio of the output display device or screen (10, 30).

Examples of media content aspect ratio include Cinerama (approximately 2.60:1), Cinemascope (2.66:1, 2.55:1, 2.35:1), Super Panavision 70 (2.20:1), Panavision (2.40:1 anamorphic), VistaVision (1.85:1,1.66:1), Academy (1.33:1, 1.37:1), etc.

Figure 2:
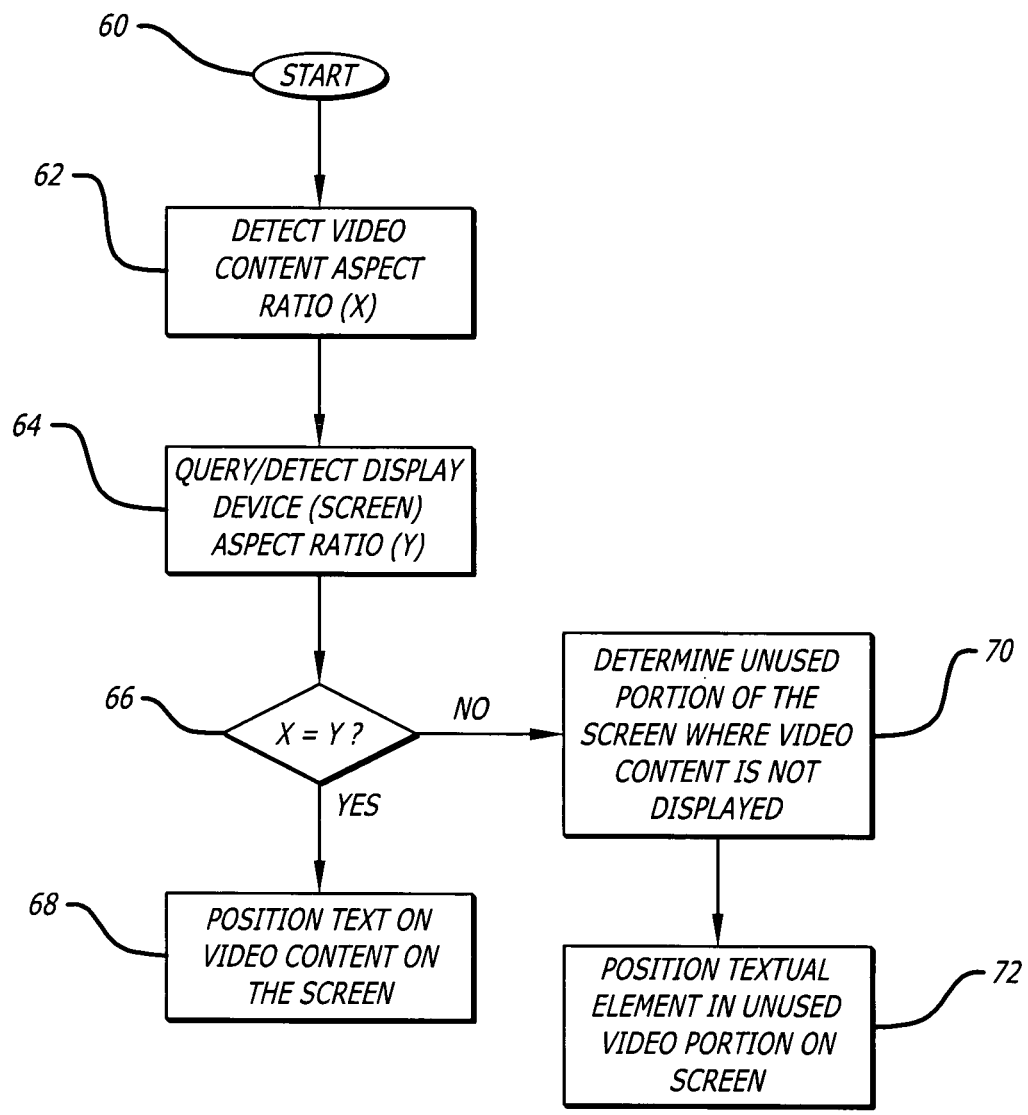
FIG. 2 is a flow chart according to an exemplary embodiment for positioning textual information in areas of unused video content on the screen of the display device.

FIG. 2 is a flow chart according to an exemplary embodiment for positioning textual information in areas of unused video content on the screen of the display device. Initially, the media control program detects the media or video content aspect ratio (X). and the display device (screen) aspect ratio (Y), generally shown as 62 and 64 respectively. If the program determines that these are identical, the textual elements are allowed to overlap the video content displayed on the screen as shown in 68.

In contrast, if the aspect ratios of the media stream or content and the output display device differ, portions of the video on the output device will be unused. For example, when a media in letterbox format (16:9 aspect ratio) plays on a 4:3 aspect ratio video output device, black bars appear on the top and bottom of the screen. These black bars mask the area of the video content unused by the video stream.

Thus, if the player logic detects a mismatch between video and screen aspect ratio, the program takes advantage of the screen by dynamically moving subtitles and graphical interface elements into the unused portions of the screen as shown by blocks 70 and 72 respectively.

For instance, in the case of a 16:9 video playing on a 4:3 aspect ratio screen where there are black bars at the top and bottom of the screen, the logic embedded in the player draws its subtitles in the black bar underneath the video, eliminating any visual conflict between the video and the text.

Thus, based on the control logic residing in the program, the textual elements may be positioned at arbitrary positions on the screen where there is substantially no video content, and as shown in FIGS. 3A, 3B, 4A, 4B.

Figure 3A:
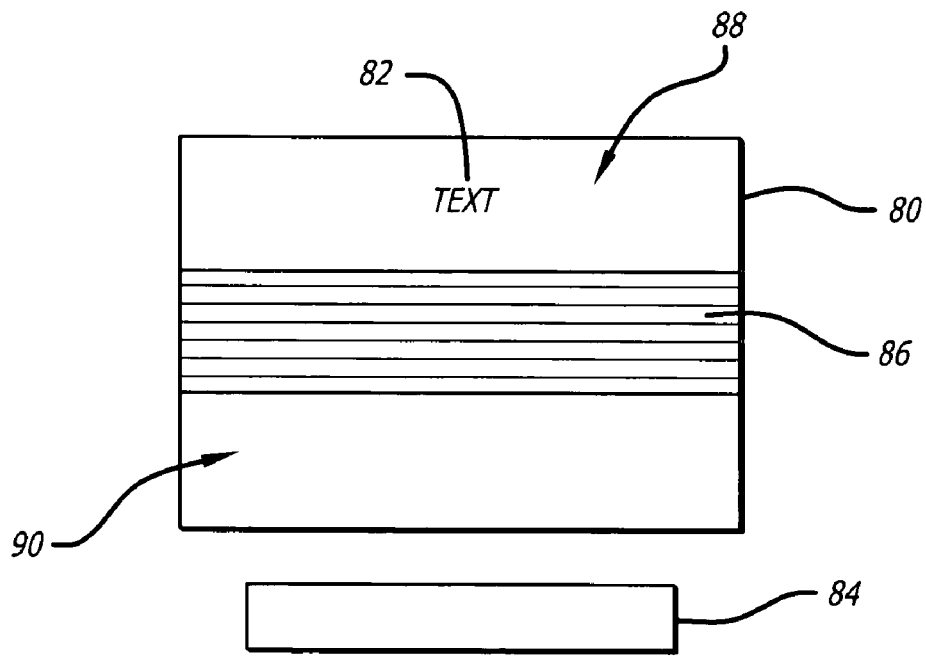
FIGS. 3A and 3B illustrate the concept of positioning textual elements, using the embodiment of FIG. 2, on an unused portion of the screen of the display device, for allowing maximum visibility of the video portion displayed on the screen as well as maximum readability of the associated textual element.
Figure 3B:
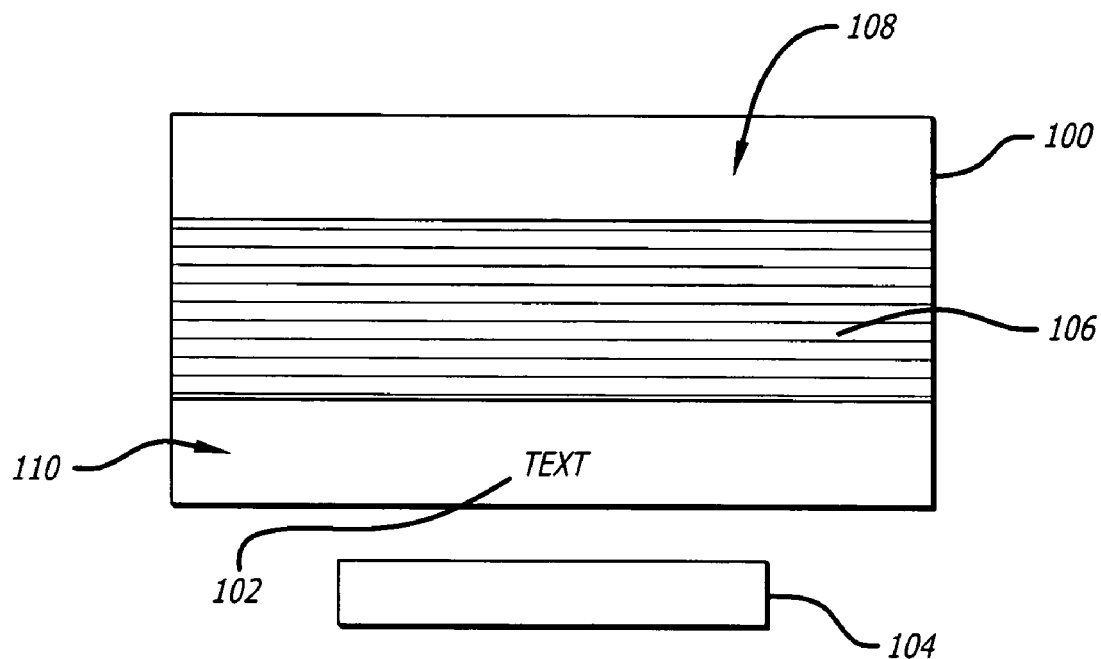

For example, as shown in FIGS. 3A, for standard aspect ration TV, with a letterbox media content 86, the textual element 82 may be positioned in either or both of the unused video portions (88, 90). A similar positioning, of the textual element 102, is shown in relation to the widescreen TV, as an example, in FIG. 3B.

Figure 4A:
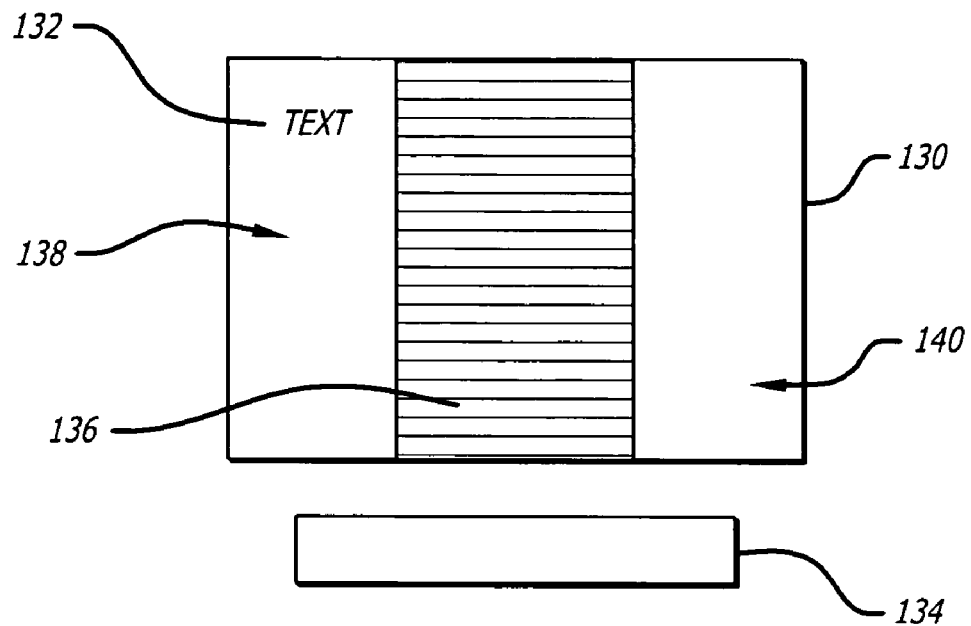
FIGS. 4A and 4B illustrate the concept of positioning textual elements, using the embodiment of FIG. 2, on an unused portion of the screen of the display device, for allowing maximum visibility of the video portion displayed on the screen as well as optimum readability of the associated textual element.
Figure 4B:
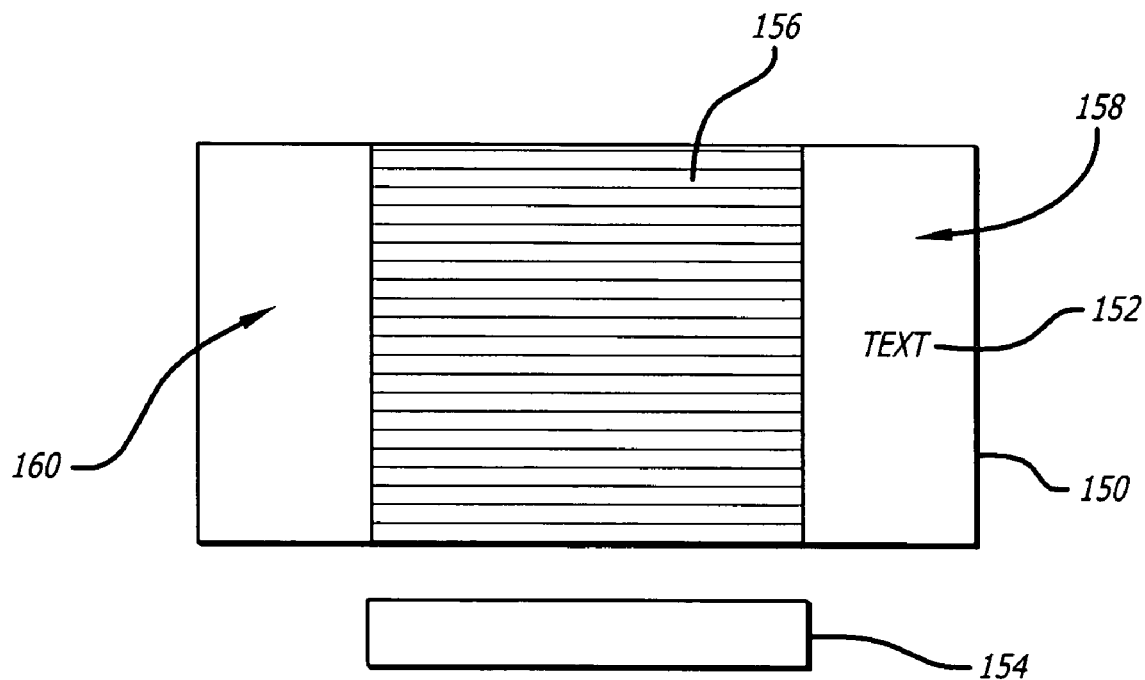

In the situation, when a real-time media transmission, such as a high definition TV signal is decoded by a set-top box (134, 154) associated with either a 4:3 or 16:9 aspect ratio TVs in FIGS. 4A and 4B, respectively, the video content may appear as pillar-boxed. In this case, the logic in the media control program re-routes the textual information (132,152) onto appropriate unused viewing areas of the screen.

In an alternative embodiment, the present system and method may also perform dynamic assignment of icons (e.g., in home-shopping interactive TV), advertisements, and menu screens or segments into the unused portions of the screens, such as the black bars, thereby maximizing the relevant visual field on the display device.

In another aspect, an interactive TV application, running on the player, may require more contiguous non-video space to eliminate any overlap of interface elements over the video playback. In this case, the video player dynamically moves the origin point of the video stream to the top of the output device, increasing the available space at the bottom of the screen. The player logic then repositions all the overlay text and interface graphics in the area below the video playback area.

It is to be understood that other embodiments may be utilized and structural and functional changes may be made without departing from the respective scope of the present invention. Possible modifications to the system include, but are not limited to, media content having arbitrary aspect ratios and display devices having arbitrary aspect ratios.

The invention claimed is:

1. A method for dynamically displaying screen elements adjacent to a video content on a display based on an aspect ratio of an output device, the method comprising:

detecting the aspect ratio of the video content;
   querying the aspect ratio of the output device from the output device;
   determining unused portions of the display based on the aspect ratio of the video content and the aspect ratio of the output device;
   displaying the video content on the display independent of the aspect ratio of the output device;
   displaying the screen elements based on the unused portions of the display device if the determining determines a mismatch between the aspect ratio of the video content and the aspect ratio of the output device.

2. The method of claim 1 wherein the screen elements are subtitles.

3. The method of claim 1 wherein the screen elements are menu options.

4. The method of claim 1 wherein the screen elements are graphics.

5. The method of claim 1 wherein the aspect ratio of the video content is 16:9 and the aspect ratio of the output device is 4:3.

6. The method of claim 5 wherein the screen elements are displayed above the video content.

7. The method of claim 5 wherein the screen elements are displayed below the video content.

8. The method of claim 1 wherein the aspect ratio of the video content is 4:3 and the aspect ratio of the output device is 16:9.

9. The method of claim 8 wherein the screen elements are displayed adjacent to the video content.

10. A system for dynamically displaying screen elements adjacent a video content on a display based on an aspect ratio of an output device, the system comprising elements for:
   detecting the aspect ratio of the video content;
   querying the aspect ratio of the output device from the output device;
   determining unused portions of the display based on the aspect ratio of the video content and the aspect ratio of the output device;
   displaying the video content on the display independent of the aspect ratio of the output device;
   displaying the screen elements based on the unused portions of the display device if the determining element determines a mismatch between the aspect ratio of the video content and the aspect ratio of the output device.

11. The system of claim 10 wherein the screen elements are subtitled texts.

12. The system of claim 10 wherein the screen elements are menus.

13. The method of claim 10 wherein the screen elements are graphics.

14. The system of claim 10 wherein the unused portions of the display exist in an area below the video content, above the video content, left side of the video content or right side of the video content.

15. The system of claim 10 wherein the element for displaying the screen elements dynamically moves the screen elements in the unused portion of the screen adjacent the vide content.

16. The system of claim 10 wherein the element for querying the aspect ratio of the output device uses multimedia interface with the output device.

17. A method of adjusting an original placement of a screen element with respect to an original placement of a video content on a display, the method comprising:
   querying an aspect ratio of an output device from the output device;
   detecting an aspect ratio of a media, wherein the media includes the screen element, the video content, information indicative of the original placement of the screen element and information indicative of the original placement of the video content;
   determining an unused area of the display based on the aspect ratio of the output device and the aspect ratio of the media;
   displaying the video content on the display in the original placement of the video content;
   modifying the original placement of the screen element to define a modified placement of the screen element based on the unused area;
   displaying the screen element in an area of the display indicated by the modified placement of the screen element.

18. The method of claim 17 wherein the querying is performed automatically, and the modifying the original placement of the screen element and the displaying the screen element are performed dynamically.

19. The method of claim 17 wherein the displaying the screen element in part overlaps with the displaying the video content.

20. The method of claim 17 wherein the determining the unused area of the display determines at least two unused areas separated by the video content, and wherein the displaying the screen element displays the screen element in the at least two unused areas.

* * * * *

UNITED STATES PATENT AND TRADEMARK OFFICE
CERTIFICATE OF CORRECTION

| | | |
|---|---|---|
| PATENT NO. | : 7,224,401 B2 | Page 1 of 1 |
| APPLICATION NO. | : 10/859888 | |
| DATED | : May 29, 2007 | |
| INVENTOR(S) | : Ackley et al. | |

It is certified that error appears in the above-identified patent and that said Letters Patent is hereby corrected as shown below:

In the claims, column 6, line 4, "vide" should be changed to --video--.

Signed and Sealed this

Seventh Day of August, 2007

JON W. DUDAS
*Director of the United States Patent and Trademark Office*